United States Patent [19]
Ellis

[11] 4,261,647
[45] Apr. 14, 1981

[54] HEAD UP DISPLAYS

[75] Inventor: Stafford M. Ellis, East Preston, England

[73] Assignee: Elliott Brothers (London) Limited, Chelmsford, England

[21] Appl. No.: 73,303

[22] Filed: Sep. 7, 1979

[30] Foreign Application Priority Data

Sep. 15, 1978 [GB] United Kingdom ............ 36942/78
Feb. 6, 1979 [GB] United Kingdom ............ 04094/79

[51] Int. Cl.³ .............................................. G02B 27/14
[52] U.S. Cl. ................................... 350/174; 356/253
[58] Field of Search ............ 350/174, 3.5, 162 ZP, 350/173; 358/220; 356/251-255

[56] References Cited

U.S. PATENT DOCUMENTS

| | | | |
|---|---|---|---|
| 3,778,548 | 12/1973 | Nistri | 350/174 |
| 3,807,829 | 4/1974 | Close | 350/174 |
| 3,940,204 | 2/1976 | Withrington | 350/174 |
| 4,099,841 | 7/1978 | Ellis | 350/174 |

*Primary Examiner*—John K. Corbin
*Assistant Examiner*—B. Wm. de los Reyes
*Attorney, Agent, or Firm*—Kirschstein, Kirschstein, Ottinger & Cobrin

[57] ABSTRACT

A display unit for a head up display wherein the combiner (11), which serves to reflect light from a display surface (14) towards an observer to provide the observer with an image of the display superimposed on his view through the combiner, comprises first and second tuned reflective coatings (25c and 27c) disposed in such angular relationship with one another and the display surface that narrow waveband light from the display surface reaches the observer after being successively transmitted through the first coating, reflected at the second coating, reflected at the first coating and transmitted through the second coating.

9 Claims, 4 Drawing Figures

HEAD UP DISPLAYS

This invention relates to head up displays and, more especially, to display units for such displays.

Such units comprise a combiner through which an observer can view a scene and a projector unit having a display surface from which light representing a display is projected onto the combiner for reflection to the observer thereby to provide the observer with an image of the display superimposed on his view through the combiner.

U.S. Pat. No. 3,940,204 discloses a display unit for a head up display which comprises a combiner in the form of a tuned reflective optical coating lens of the holographic type and a projector unit comprising a generally planar narrow waveband light emitting display surface such as, for example, a cathode ray tube screen, a folding prism, and between the display surface and the prism a relay lens optical system.

Narrow waveband, e.g. green, light from the display surface is transmitted by the optical system to the prism. The prism is located below the line of sight of the observer to the lower edge of the holographic lens. Light incident on the prism is reflected upwardly to the holographic lens from whence it is reflected to the observer's eye position.

Collimation of the image of the display is effected substantially wholly by the holographic lens which transmits without significant attenuation light incident thereon from the distant scene upon which the virtual display image appears superimposed.

In practice the presence of axial coma and astigmatism, particularly pronounced in an off-axis system such as that mentioned, dictates the provision of correcting means in the optical relay system and this in turn gives rise to severe packaging problems, especially with units for use in a confined space such as an aircraft cockpit.

It is an object of the present invention to provide a head up display unit using tuned reflective optical coatings wherein the problems associated with providing such correcting means are alleviated.

The present invention provides a display unit for a head up display wherein the combiner has first and second tuned reflective optical coatings each of which intercepts the line of sight of the observer through the combiner and which converge towards one another so as to define a tapering space; the angular relationship of the coatings with one another and with the display surface of the projector unit being such that narrow waveband light from the display surface is, in turn, transmitted through the first coating, reflected at the second coating, reflected at the first coating and transmitted through the second coating to the observer's viewing position.

Preferably said light from the display surface is directly incident on said first coating at an angle of transmission there through.

The unit provided by the invention is, as is the prior art unit referred to previously, an off-axis optical system, but as a result of the configuration of the coatings and the display surface, the angle of departure from an axial system can be significantly less than that which obtains in the prior art. Accordingly the amount of correction needed to avoid displayed image defects is substantially less than that of the prior art unit.

Furthermore such correction as may be needed in any particular case can be effected by choice of suitable surface contours for the coatings and/or choice of a pattern of variation in reflective properties of both the coatings or either one of them.

By a tuned reflective optical coating is meant an optical coating having the property of reflecting efficiently light at particular combinations of wavelength and incidence angle. The coating is described as tuned to these combinations of wavelength and incidence. Light which does not satisfy the tuned condition will be transmitted by the coating with very little reflection loss.

A coating tuned to wavelength $\lambda$ at normal incidence is also tuned to wavelength $\lambda'$ at incidence angle I where $\lambda' = \lambda \cos I$, the incidence angle I being measured, not in air, but in the medium of the coating.

Tuned reflective optical coatings in an arrangement in accordance with the invention may be produced holographically or, equivalently, as multilayer optical coatings, or indeed by any other technique now known or hereafter discovered, whereby 'tuned' characteristics may be obtained.

One display unit in accordance with the invention will now be described by way of example with reference to the accompanying drawings in which.

Figure 1:
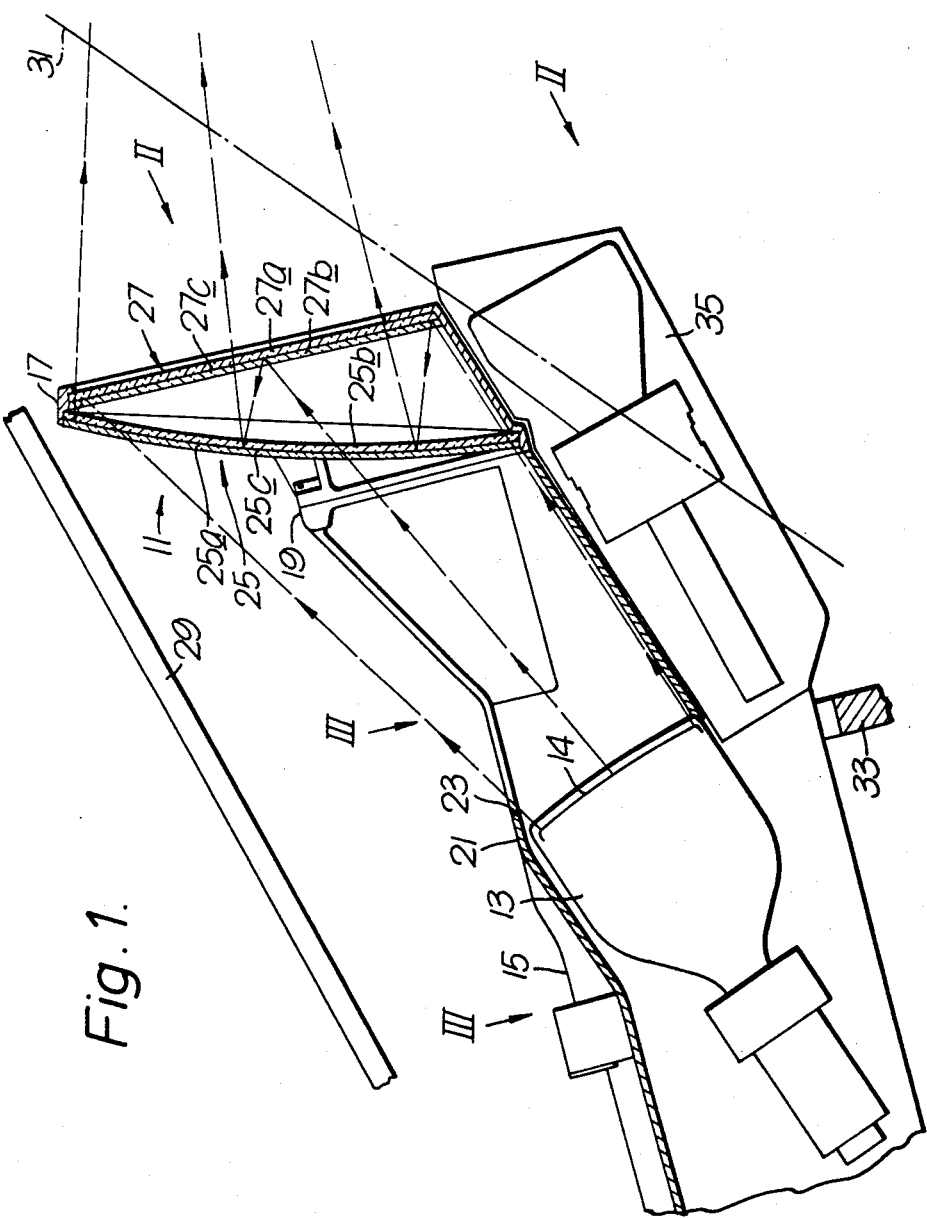
FIG. 1 shows longitudinal section through the display unit.
Figure 2:
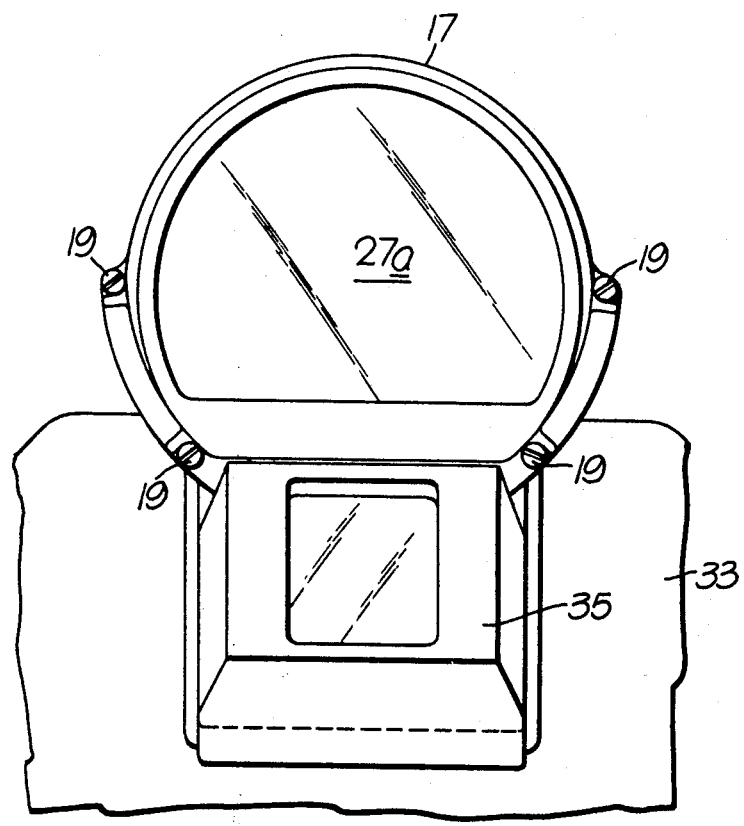
FIG. 2 shows a projection of the display unit in the direction II—II of FIG. 1.
Figure 3:
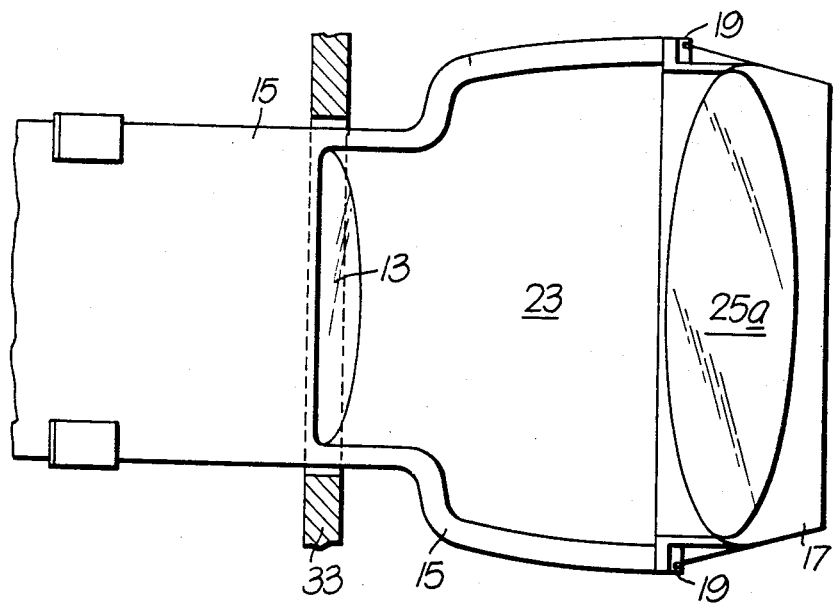
FIG. 3 shows a projection of the display unit in the direction III—III of FIG. 1.

Referring to FIGS. 1 to 3, the display unit comprises a combiner 11 and a cathode ray tube 13 whose screen 14 is coated with a narrow 'green' waveband phosphor. The cathode ray tube 13 is contained in a housing 15. The combiner 11 has a support frame 17 which is rigidly secured by fasteners 19 on each side to the housing 15 at the forward end thereof. The upper surface 21 of the housing 15 has an aperture 23. The combiner 11 comprises a first member 25 provided with a first holographic tuned reflective optical film coating and a second member 27 provided with a second holographic tuned reflective optical film coating. The member 27 is between the member 25 and the position occupied by an observer's eyes in use of the unit, and the two members 25 and 27 converge towards one another in an upwards direction. The members 25, 27 each consist of two supporting glass elements 25a 25b; 27a 27b, between which is sandwiched the associated holographic film coating 25c, 27c.

The spatial relationship between the member 25, and in particular its film 25c and the screen 14 of the cathode ray tube 13 are such that the narrow waveband 'green' light, passing through the aperture 23 from each point of the phosphor of the C.R.T. and incident on the holographic film 25c, is transmitted by that film.

The spatial relationship between the members 25 and 27, and in particular their films 25c and 27c is such that some of the narrow waveband 'green' light transmitted by the film 25c is selectively reflected by the holographic film 27c, only three such rays from the cathode ray tube being illustrated. Of the rays transmitted through the film 25c from each point on the screen 14, only those rays which fall within a narrow conical ray bundle whose rays make with the film 27c an angle which falls within the reflective angular range of that film are reflected at film 27c; rays outside each such conical bundle are transmitted by the film 27c. Such transmitted rays are not received at the observer's eyes because they pass outside the range of head movement permitted to the observer.

The rays selectively reflected at the film 27c are incident on the holographic film 25c. Once again, only the rays from each reflection point of the film 27c which fall within a narrow conical ray bundle whose rays make an angle with the film 25c falling within the reflective angle range of that film, are reflected. The rays reflected at film 25c are incident on the film 27c; but this time their angles of incidence fall outside the reflective range of the film 27c and, as a result, the rays reflected by the film 25c are transmitted by the film 27c to a small range of positions around the observer's design eye position O.

The observer is thus provided with an image of the display presented at the screen of the cathode ray tube superimposed on his view through the holographic films 25c, 27c.

As shown in FIG. 1, the member 25 and its film 25c are spherical and the member 27 and its film 27c are flat. As may be observed, there are no other active optical elements in the system and it is thus the function of the member 25 alone, and, in particular, its film 25c, to produce a virtual image at infinity of the display presented at the screen of the cathode ray tube 13 so that such display may be viewed while the observer's eyes are focussed on the distant scene through the two holographic films 25c, 27c. It will be appreciated that the holographic films 25c, 27c transmit light from the distant scene without any significant attenuation, except of light in the narrow 'green' waveband of the cathode ray tube screen phosphor.

The possibility of film 25c being spherical arises as a result of the relatively small departure in the unit from an on-axis optical system. The optical system, although an off-axis one, is less pronounced in this respect than is the case with prior art units.

Nevertheless, in practical forms of head up display unit according to the invention, it may be necessary to introduce certain corrections to compensate for defects of the optical system, in particular those arising from its off-axis configuration.

Accordingly it will be understood that in a unit according to the invention the geometries of the films 25c, 27c, may depart from the spherical in the one case and the flat in the other. Alternatively whilst retaining the spherical and flat geometries of the two films, the films may be optically formed, using laser light, to have reflective properties which depart from those normally associated with spherical or flat reflectors, as the case may be. More generally, the geometries of the films 25c, 27c may be other than spherical and flat, respectively, and the films may be given reflective properties not normally associated with reflective surfaces of the particular geometrical forms chosen for the films.

The manner in which holographic characteristics or properties of the films are obtained admits, in general, of the possibility of producing a large variety of reflective characteristics at these films, and such characteristics may be employed in a variety of ways to effect variations in the optical properties of the unit optical system and, in particular, to ameliorate the inherent defects of the optical system. For example, where the defect is one of astigmatism, a cylindrical component could be introduced at the films 25c or 27c or at both such films.

It should, however, be understood that the present invention is concerned not so much with the provision of specific means and methods for eliminating defects such as coma and astigmatism but rather to provide a head up display unit employing tuned reflective optical coatings which is capable of being neatly packaged so as to fit in a wide range of modern aircraft.

As indicated in FIGS. 1 to 3 of the drawings, the head up display unit is adapted for use by a pilot in an aircraft cockpit with the unit supported between the aircraft canopy 29 and an ejection line 31 and extending through an aperture in the instrument panel 33. The packaging is such that a head down display unit 35 for use by the pilot can be located immediately beneath the head up display unit.

Figure 4:
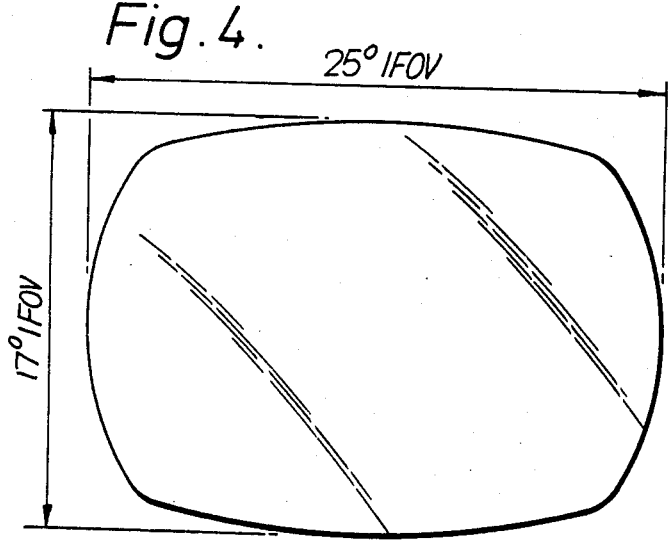
FIG. 4 illustrates the instantaneous field of view (IFOV) obtainable using the display unit from the design eye position.

A typical field of view of the display available to the pilot using the unit at the design eye position is shown in FIG. 4.

It will be appreciated that in different particular embodiments the angular relationships between the various components may differ appreciably. The specific example illustrated is optimized for a particular set of spatial constraints; and, as may be gathered, these constraints will vary within limits from case to case, including a tolerance to observer's eye position.

It will be understood that while in a unit according to the invention, light from the display surface is preferably directly incident on the first coating to more nearly obtain an 'on-axis' optical system, some form of optical arrangement, e.g. for bending the paths of light rays, may be provided between the display surface and first coating e.g. to overcome some particular packaging problem.

It is pointed out that whilst in the embodiment of the invention described above by way of example the display is derived from a cathode ray tube, in other arrangements in accordance with the invention the display may be derived from other devices e.g. a liquid crystal display device.

I claim:

1. A display unit for a head up display comprising a combiner through which an observer can view a scene and a projector unit having a display surface from which light representing a display is projected onto the combiner for reflection to the observer thereby to provide the observer with an image of the display superimposed on his view through the combiner, characterized in that the combiner has first and second tuned reflective optical coatings each of which intercepts the line of sight of the observer through the combiner and which coatings converge towards one another so as to define a tapering space; the angular relationship of the coatings with one another and with the rays of light from the display surface of the projector unit being such that rays of light within a certain narrow waveband from the display surface are, in turn, transmitted through the first coating, reflected at the second coating, reflected at the first coating and transmitted through the second coating to the observer's viewing position.

2. A display unit according to claim 1 wherein said light from the display surface is directly incident on said first coating at an angle of transmission there through.

3. A display unit according to claim 1 wherein the display surface lies to one side of the observer's line of sight through the combiner and said coatings converge towards the opposite side of said line of sight.

4. A display unit according to claim 1 wherein the surface contours of said coatings are such as to present a collimated image of the display to the observer.

5. A display unit according to claim 4 wherein said first coating is substantially spherical and said second coating is substantially flat.

6. A display unit according to claim 1 wherein the reflective properties of at least one of said coatings varies in a pattern such as to correct a defect of the image of the display presented to the observer.

7. A display unit according to claim 1 wherein the shapes of said coatings are such as to correct a defect of the image of the display presented to the observer.

8. A display unit according to claim 1 wherein each said coating is sandwiched between a pair of supporting light transparent elements.

9. A display unit for a head up display comprising a combiner through which an observer can view a scene and a projector unit having a display surface from which light representing a display is projected onto the combiner for reflection to the observer thereby to provide the observer with an image of the display superimposed on his view through the combiner, characterized in that the combiner has first and second tuned reflective optical coatings each of which intercepts the line of sight of the observer through the combiner and which coatings converge towards one another so as to define a tapering space; the angular relationship of the coatings with one another and with the rays of light from the display surface of the projector unit being such that rays of light within a certain narrow waveband from the display surface are, in turn, reflected at the second coating, reflected at the first coating and transmitted through the second coating to the observer's viewing position.

* * * * *